(12) United States Patent
Kaita et al.

(10) Patent No.: US 6,407,269 B2
(45) Date of Patent: Jun. 18, 2002

(54) CATALYST FOR TRANSESTERIFICATION

(75) Inventors: Jun Kaita; Taku Mimura; Noriaki Fukuoka; Yasuyuki Hattori, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/885,962

(22) Filed: Jun. 22, 2001

Related U.S. Application Data

(62) Division of application No. 09/587,569, filed on Jun. 6, 2000, now abandoned.

(30) Foreign Application Priority Data

| Jun. 8, 1999 | (JP) | ............................................ 11-161575 |
| Jul. 9, 1999 | (JP) | ............................................ 11-196324 |

(51) Int. Cl.$^7$ .............................. C11C 1/00; C11C 3/00
(52) U.S. Cl. ..................... 554/167; 554/163; 554/169
(58) Field of Search ................................. 554/169, 163, 554/167; 502/208

(56) References Cited

U.S. PATENT DOCUMENTS

| 4,310,440 A | 1/1982 | Wilson et al. |
| 4,440,871 A | 4/1984 | Lok et al. |
| 4,713,227 A | 12/1987 | Derouane et al. |
| 4,879,405 A | 11/1989 | Naeumann et al. |
| 4,968,831 A | 11/1990 | Goetz et al. |
| 5,057,295 A | 10/1991 | Flanigen et al. |
| 5,102,642 A | 4/1992 | Clark et al. |
| 5,130,435 A | 7/1992 | Hoelderich et al. |
| 5,144,061 A | 9/1992 | Hoelderich et al. |
| 5,196,571 A | 3/1993 | Hoelderich et al. |
| 5,888,921 A | 3/1999 | Tsang et al. |
| 6,004,898 A | 12/1999 | Sun |
| 6,040,264 A | 3/2000 | Sun |

FOREIGN PATENT DOCUMENTS

| EP | 0 623 581 | 11/1994 |
| JP | 61-200943 | 9/1986 |
| JP | 61-236749 | 10/1986 |
| JP | 04-028250 | 5/1992 |
| WO | WO 98/25876 | 6/1998 |

*Primary Examiner*—Deborah Carr
(74) *Attorney, Agent, or Firm*—Oblon, Spivak, McClelland, Maier & Neustadt, P.C.

(57) ABSTRACT

The present invention provides a heterogeneous catalyst which is highly active, excellent in selectivity and free from elution of its catalyst-components during reaction and which has long lifetime. That is, a phosphate of a metal selected from the group consisting of aluminum, gallium and iron is used as the catalyst for transesterification of the present invention.

8 Claims, No Drawings

CATALYST FOR TRANSESTERIFICATION

This application is a division of application Ser. No. 09/587,569 filed Jun. 6, 2000, now abandoned.

TECHNICAL FIELD

The present invention relates to a catalyst for transesterification.

PRIOR ART

As a catalyst for transesterification, heterogeneous catalysts have been examined from the viewpoint of separating a catalyst-component after reaction. For example, there are known a method for utilizing an inorganic solid acid such as silica-alumina and zeolite (JP-A 61-200943), a catalyst containing aluminum oxide and/or iron oxide (JP-A 61-236749), a method for using a silicate or the like of the group IV elements (EP0623581A2), a method for utilizing an organic solid acid such as an ion-exchange resin (WO98/25876) and a method for using hydrous zirconium oxide (JP-B 4-28250).

However, the heterogeneous catalysts described above could not satisfy all of activity, selectivity and durability in transesterification. Specifically, the inorganic solid acid has strong acid-strength, and for example, a zeolite such as mordenite gives rise to significant formation of an undesirable by-product such as an ether upon transesterification. The activity of the silicates of the group IV elements is relatively low, and thus there is a restriction that high temperature conditions must be adopted. Further, elution of silicon occurs during the reaction to permit a reduction in the activity during a long operation. The ion-exchange resin as an organic solid acid is low not only in activity but also in thermostability, and thus there is a limit upon its usable temperature range. Nevertheless, the patent using the ion-exchange resin describes the condition that the reaction is conducted in a gaseous phase, adjusting temperature and pressure. Accordingly, a catalyst using the ion-exchange resin is applicable to only low-boiling and low-molecular reactants and cannot be applied to high-boiling reactants. On one hand, the catalyst using the ion-exchange resin has the problem of swelling upon contact with lower alcohol. The utilization of the hydrous zirconium oxide is disclosed as a means of improving selectivity, but its industrial application is not achieved due to low activity thereof.

DISCLOSURE OF INVENTION

Accordingly, the object of the present invention is to provide a heterogeneous catalyst which is highly active, excellent in selectivity and free from elution of its catalytically active components and which has long lifetime.

The present invention relates to a catalyst for transesterification comprising a phosphate of at least one metal selected from the group consisting of aluminum, gallium and iron. Aluminum is particularly preferable.

Preferably, the molar ratio of the metal:phosphoric acid is from 1:3 to 1:0.01.

The catalyst may comprise a boric acid-group or an alkaline earth metal.

Also, the present invention relates to a method for producing a catalyst for transesterification, which comprises bringing a solution containing a phosphate ion into contact with at least one of an oxide, a hydroxide and a nitrate of at least one metal selected from the group consisting of aluminum, gallium and iron.

The above-mentioned method comprises preferably calcining, further.

In the above-mentioned method, the molar ratio of the metal ion to phosphate ion is preferably from 1:2 to 1:0.01.

The present invention relates to a method for producing an ester compound, which comprises transesterifying an alcohol, a carboxylic acid or an ester compound with a starting ester in the presence of a catalyst comprising a phosphate of at least one metal selected from the group consisting of aluminum, gallium and iron.

The present invention preferably provides a method for producing an ester compound, which comprises transesterifying an alcohol, a carboxylic acid or an ester compound with a starting ester in the presence of the catalyst as defined above.

In the above-mentioned method for producing an ester compound, the catalyst preferably comprises a boric acid-group or an alkaline earth metal.

In the above-mentioned method for producing an ester compound, the catalyst is preferably that obtained by the process as defined above.

The said catalyst can also be prepared from a metal phosphate and an alkaline earth metal, boric acid or a borate.

Further, the present invention relates to use of a phosphate of at least one metal selected from the group consisting of aluminum, gallium and iron as catalyst for transesterification.

MODES FOR CARRYING OUT INVENTION

In general, a phosphate may be in many forms such as orthophosphate, polyphosphate, metaphosphate and pyrophosphate. Then, as the catalyst of the present invention, orthophosphate is preferably used. However, a phosphate in other form may also be included without hindrance. The metal forming the phosphate of the present invention is one or more members selected from the group consisting of aluminum, gallium and iron. Among them, aluminum is particularly preferable. Further, two or more metal phosphates may be used as complex, and such metals are not limited the metals mentioned above.

As to the composition of the catalyst, the molar ratio of the metal ion to the phosphate ion is preferably 1:3 to 1:0.01, more preferably 1:3 to 1:0.1 and especially preferably 1:1.2 to 1:0.2, from the viewpoint of catalytic activity.

The phosphates used in the present invention may be commercially available or may be obtained by preparation. The form of the phosphate may be any of amorphous and crystalline one. For example, one of the amorphous phosphates can be obtained by allowing an alkaline substance to act on a mixture of a metal nitrate-solution and phosphoric acid, thereby obtaining a precipitate and following up with treatments such as filtration, washing with water, drying and calcination. The precipitate can be used as the catalyst in a dried form without subjection to calcination. In this case, formation of ethers is suppressed.

From the viewpoint of activity, it is preferable to calcine the catalyst for 0.1 hour or more at 150° C. or higher.

As to the composition of the catalyst obtained by precipitation, the molar ratio of the metal ion to the phosphate ion is preferably 1:3 to 1:0.1, more preferably 1:1.2 to 1:0.2, from the viewpoint of catalytic activity.

In preparing a metal phosphate or a complexed metal phosphate, a carrier (which may be a supporting member) having its large surface-area may be coexist to prepare an immobilized (or supported) metal phosphate or an immobilized (or supported) complexed metal phosphate on the carrier. The carrier may be used as one which is generally used for carrier such as silica, alumina, silica-alumina, titania, zirconia and an activated carbon. If the carrier is used in excess, the content of the phosphate as its active component is lowered to make the activity low. Accordingly, the ratio of the carrier to the catalyst is preferably not more than 90% by weight.

The method for making a phosphate ion adhere to a metal oxide etc. by bringing a solution of the phosphate ion into contact with the metal oxide etc. includes the method (a) in which the metal oxide etc. are dispersed in the solution of the phosphate ion and a solvent thereof is evaporated from the dispersion to allow the phosphate ion to adhere to the metal oxide etc. as they are (impregnation), the method (b) in which the solution of the phosphate ion is passed through metal oxide etc. followed by drying, and the method (c) in which metal oxide etc. are impregnated with the solution of the phosphate ion in an amount corresponding to the pore capacity of the metal oxide etc. followed by drying (Incipient Wetting Method). Among them, the method (a) is generally used.

The phosphate ion may be added in such an amount that a ratio of phosphorus atom to metal atom is 0.01 to 2.0, in the catalyst obtained by calcination. It is more preferable that the ratio is 0.05 to 1.0.

Calcination of the catalyst is preferably conducted at a temperature in the range of 150 to 1000° C. and it is more preferably done in the range of 200 to 800° C. The effect can be sufficiently obtained by means of calcination in a short time under this temperature condition, but the said temperature is preferably maintained, it is more preferably done for 0.5 hour or more, and it is further preferably done for 1.0 hour or more.

Examples of the crystalline phosphate include a crystalline ammonium phosphate such as VPI-5 and AlPO-5. VPI-5 is a crystalline aluminum phosphate having its pore diameter of 1.2 to 1.3 nm and can be obtained by a productive process described in the literature (ZEOLITES, vol.12, p.2, 1992). AlPO-5 is also an aluminum phosphate having crystallinity and can be obtained by a synthetic process described in the literature (Shokubai (Catalyst), vol. 27, p. 251, 1985).

Further, a complexed phosphate catalyst can be prepared in coexistence of two or more metals during preparation.

For example, the effect of improving selectivity such as suppressing an ether can be obtained by adding an alkaline earth metal. The alkaline earth metal is preferably magnesium, calcium, strontium and barium. Among them, magnesium and calcium are particularly preferable.

From the viewpoint of further improvements in catalytic activity, the catalyst can be prepared by allowing boric acid and/or a borate to be coexistent besides phosphoric acid during preparation. Specifically, boric acid-groups can be contained such that the content of boric acid-group, as defined in Equation (1), is in the range of 0.1 to 60% by molecule.

$$\text{content of boric acid-group} = \frac{\text{Number of boron atoms}}{\left(\text{number of boron atoms}\right) + \left(\text{number of phosphorus atoms}\right)} \times 100 \quad (1)$$

In case the catalyst is powder, the catalyst can be used by dispersing the catalyst, as it is, in a raw material. On the other hand, the catalyst can be used after molding a form of the catalyst. A proper binder may be used at molding. When the catalyst being powder is used, the catalyst is separated by filtration from the reaction-product after the reaction. When the catalyst being a molded catalyst is used, it is possible that a continuous reaction is conducted by charging the catalyst into a reaction-column.

The transesterification is conducted by mixing a starting ester with a starting alcohol, a starting ester with a starting carboxylic acid, or a starting ester with another starting ester and then brining the resultant mixture into contact with the catalyst under a reaction-condition. The starting ester, the starting alcohol and the starting carboxylic acid for use are not particularly limited.

For example, the starting ester may be an ester or a partial ester of a $C_1$ to $C_{22}$ linear or branched aliphatic carboxylic acid or aromatic carboxylic acid or a mixture thereof and a $C_1$ to $C_{22}$ linear or branched monohydric alcohol or polyhydric alcohol. More specifically, it may be, for example, an ester of a carboxylic acid such as acetic acid, butyric acid, caproic acid, caprylic acid, capric acid, lauric acid, myristic acid, palmitic acid, oleic acid and stearic acid or a dicarboxylic acid or a mixture thereof and a monohydric aliphatic alcohol such as methanol, ethanol, propanol, butanol, octanol and stearyl alcohol, a monohydric aromatic alcohol such as benzyl alcohol, or a polyhydric alcohol such as ethylene glycol, propylene glycol, glycerol, pentaerythritol and sorbitol. Examples of such an ester include a natural vegetable oil such as monoglyceride, diglyceride, triglyceride, coconut oil, palm oil and palm-kernel oil and an animal oil such as a beef-tallow and a pork-lard.

Then, as the starting alcohol, a $C_1$ to $C_{22}$ linear or branched monohydric alcohol or polyhydric alcohol is used. More specifically, it maybe instanced as a monohydric aliphatic alcohol such as methanol, ethanol, propanol, butanol, octanol and stearyl alcohol, a monohydric aromatic alcohol such as benzyl alcohol and a polyhydric alcohol such as ethylene glycol, propylene glycol, glycerol, pentaerythritol and sorbitol.

Then, as the starting carboxylic acid, a $C_1$ to $C_{22}$ linear or branched aliphatic carboxylic acid or aromatic carboxylic acid is used. More specifically, it maybe, for example, instanced as acetic acid, butyric acid, caproic acid, caprylic acid, capric acid, lauric acid, myristic acid, palmitic acid, oleic acid and stearic acid.

The charging ratio of the starting ester to the starting alcohol, the starting carboxylic acid or the other starting ester (hereinafter referred to as starting alcohol etc.) can be varied depending on the required purity of the resultant ester product. That is, in case it is allowable that a certain amount of the starting ester is present in the product to be impure, the fed amount of the starting alcohol etc. may be the stoichiometric amount or less. Namely, the consumed amount of the starting alcohol etc. can be reduced. On the other hand, in case a higher purity of the ester product is desired, it is possible that an excess of the starting alcohol etc. is fed so as to shift equilibrium to ester. Accordingly, a higher yield can be obtained.

As the method of transesterification, a conventional method can be used, as it is. For example, the starting ester and the starting alcohol can be continuously fed to a reaction-column charged with the catalyst or can be reacted in batch-wise in a reaction chamber. Further, in case a separated liquid such as glycerol is generated as the reaction proceeds, it can also be separated and removed continuously or intermittently. In addition, the reaction can be carried out under the condition of ordinary pressure or pressurization. The condition of pressurization can accelerate alcohol liquefying so that it is kinetically advantageous.

The catalyst of the present invention is excellent in thermostability and stable even at 400° C. or more. Accordingly, there is no particular limit to the condition of the used reaction-temperature. Further, the catalyst is insoluble in the starting ester and the starting alcohol etc. and thus elution of its active component does not take place. Therefore, the reaction can be carried out in both of gas phase system and liquid phase system.

According to the present invention, a heterogeneous catalyst can be obtained, which is highly active, excellent in selectivity and free from elution of its catalyst-component and which has long lifetime. By using the present catalyst, a high quality ester can be continuously produced by transesterification for a long period, easily separating the product from the catalyst.

EXAMPLES

Example 1

562.7 g (1.5 moles) of aluminum nitrate hydrated with nine moles of water per mole thereof ($Al(NO_3)_3 \cdot 9H_2O$) were dissolved in 5000 g of water, and 172.9 g (1.5 moles) of 85% aqueous solution of orthophosphoric acid was added thereto. The pH of this aqueous mixture was adjusted to 7 by adding dropwise 10% aqueous solution of ammonia thereto at 25° C., to obtain a precipitate of aluminum phosphate. The precipitate was filtered out, washed with water, and dried at 110° C. for 12 hours to obtain a catalyst for transesterification (this catalyst is referred to as A-1).

55.8 g of methanol was added to 200 g of palm-kernel oil (triglyceride), and 10 g of the above-mentioned Catalyst A-1 was added thereto. After this mixture was reacted at the reaction-temperature of 200° C. for 5 hours, the catalyst was removed by filtration. The liquid mixture was analyzed after the reaction. Thus, the degree of conversion of the triglyceride in the starting material was 83% and the yield of methyl ester was 63%. The concentration of ethers produced as by-product in the glycerol phase was as low as 0.8%. Here, the ethers refer to 3-methoxy-1,2-propanediol and 2-methoxy-1,3-propanediol formed by dehydration of glycerol and methanol. At this time, in the product mixture after the reaction, dissolved aluminum or phosphorus was not detected so that the removal of an eluted component of catalyst by adsorption treatment etc. was not necessary.

Example 2

A precipitate of aluminum phosphate was obtained in the same manner as in Example 1. This precipitate was filtered out, washed with water, dried at 110° C. for 12 hours and then calcined at 400° C. for 3 hours to obtain a catalyst for transesterification (this catalyst is referred to as A-2). The reaction was carried out using the above-mentioned Catalyst A-2 under the same condition as in Example 1. The result is shown in Table 1. Further, in the product mixture after the reaction, dissolved aluminum or phosphorus was not detected.

Examples 3 to 5

Catalysts for transesterification were obtained in the same manner as in Example 2 except that the molar ratio of $Al(NO_3)_3 \cdot 9H_2O$ to orthophosphoric acid to be charged was 1:1.2, 1:0.5, and 1:0.15 respectively. They were dried at 110° C. for 12 hours and then calcined at 400° C. for 3 hours (the resultant catalysts are referred to as A-3, A-4 and A-5 respectively). The reaction was carried out using each of the catalysts under the same condition as in Example 1. The result is shown in Table 1. Any and all of the catalysts exhibited good activity and selectivity. Further, in the product mixture after the reaction, dissolved aluminum or phosphorus was not detected.

Example 6

An aqueous solution of ammonia was added dropwise at 25° C. into an aqueous mixture containing orthophosphoric acid and gallium nitrate hydrated with n moles of water per mole thereof (n is 7 to 9, which may be $Ga(NO_3)_3 \cdot nH_2O$) at the molar ratio of 1:1, whereby a precipitate of gallium phosphate was obtained. Then, this precipitate was filtered out, washed with water, dried and calcined to obtain a catalyst for transesterification (this catalyst is referred to as G). The reaction was carried out using the above-mentioned Catalyst G under the same condition as in Example 1. The result is shown in Table 1. Further, in the product mixture after the reaction, dissolved gallium or phosphorus was not detected.

Example 7

An aqueous solution of ammonia was added dropwise at 25° C. into an aqueous mixture containing orthophosphoric acid and iron (III) nitrate hydrated with nine moles of water per mole thereof ($Fe(NO_3)_3 \cdot 9H_2O$) at the molar ratio of 1:1, whereby a precipitate of iron (III) phosphate (which may be $FePO_4 \cdot nH_2O$) was obtained. Then, this precipitate was filtered out, washed with water, dried and calcined to obtain a catalyst for transesterification (this catalyst is referred to as F). The reaction was carried out using the above-mentioned Catalyst F under the same condition as in Example 1. The result is shown in Table 1. Further, in the product mixture after the reaction, dissolved iron or phosphorus was not detected.

Example 8

An aqueous solution containing $Al(NO_3)_3 \cdot 9H_2O$ and gallium nitrate hydrated with n moles of water per mole thereof (n is 7 to 9) at the molar ratio of 9:1 was prepared, and 85% aqueous solution of orthophosphoric acid was added thereto in such an amount that the molar number of orthophosphoric acid became equal to the total molar number of the aluminum compound and the gallium compound. An aqueous solution of ammonia was added dropwise at 25° C. into this aqueous mixture, whereby a precipitate of aluminum phosphate-gallium was obtained. Then, this precipitate was filtered out, dried and calcined to obtain a catalyst for transesterification (this catalyst is referred to as AG). The reaction was carried out using the above-mentioned Catalyst AG under the same condition as in Example 1. The result is shown in Table 1. Further, in the product mixture after the reaction, dissolved aluminum, gallium or phosphorus was not detected.

Example 9

An aqueous solution containing $Al(NO_3)_3 \cdot 9H_2O$ and magnesium nitrate hydrated with nine moles of water per mole thereof ($Mg(NO_3)_2 \cdot 9H_2O$) at the molar ratio of 9:1 was prepared, and 85% aqueous solution of orthophosphoric acid was added thereto in such an amount that the molar number of orthophosphoric acid became equal to the total molar number of the aluminum compound and the magnesium compound. An aqueous solution ammonia was added dropwise at 25° C. into this aqueous mixture, whereby a precipitate of aluminum phosphate-magnesium was obtained. Then, this precipitate was filtered out, washed with water, dried and calcined to obtain a catalyst for transesterification (this catalyst is referred to as AM).

After the reaction was conducted using 10 g of the above-mentioned Catalyst AM under the same condition as in Example 1, the catalyst was removed by filtration. Then, the resultant product after the reaction was analyzed. Therefore, the degree of conversion of the triglyceride in the starting material was 82%, and the yield of methyl ester was 66%. The concentration of ether(s) produced as by-product in the glycerol phase was 1.2%, and improvement was observed in the selectivity by making magnesium coexist therein. Further, in the product mixture after the reaction, dissolved aluminum, magnesium or phosphorus was not detected.

Example 10

68.7 g of alumina powder (Cataloid, Catalysts & Chemicals Industries Co., Ltd.) was dispersed in 600 g of water, and 37.5 g of $Al(NO_3)_3 \cdot 9H_2O$ and 11.5 g of 85% aqueous solution of orthophosphoric acid were added thereto. An aqueous solution of ammonia was added dropwise at 25° C. into this dispersion whereby a precipitate of aluminum phosphate carried on alumina was obtained. Then, this precipitate was filtered out, washed with water, dried at 110° C. for 12 hours and then calcined at 400° C. for 3 hours to obtain a catalyst for transesterification (this catalyst is referred to as A-6). At this time, the content of the carrier in the catalyst for transesterification was 80%. The reaction was carried out using the above-mentioned Catalyst A-6 under the same condition as in Example 1. The result is shown in Table 1. Further, in the product mixture after the reaction, dissolved aluminum or phosphorus was not detected.

Examples 11 and 12

Catalysts for transesterification were obtained in the same manner as in Example 10 except that the contents of the carrier in the catalysts for transesterification became 50% by weight and 25% by weight respectively (these catalysts are referred to as A-7 and A-8 respectively). The reaction was carried out using each of the above-mentioned Catalyst A-7 and A-8 under the same condition as in Example 1. The result is shown in Table 1. Both of the catalysts exhibited good activity and selectivity. Then, dissolved aluminum or phosphorus was not detected.

Example 13

112.5 g of Al(NO3)$_3$.9H$_2$O, 27.7 g of 85% aqueous solution of orthophosphoric acid and 3.71 g of boric acid were added to 1000 g of water to be dissolved. An aqueous solution of ammonia was added dropwise at 25° C. into this aqueous mixture whereby a precipitate was obtained. Then, this precipitate was filtered out, washed with water, dried at 110° C. for 12 hours and then calcined at 400° C. for 3 hours to obtain a catalyst for transesterification (this catalyst is referred to as A-9). The content of boric acid-group, as defined in Equation (1), was 20% by molecule. The reaction was carried out using the above-mentioned Catalyst A-9 under the same condition as in Example 1. The result is shown in Table 1. Further, in the product mixture after the reaction, dissolved aluminum, phosphorus or boron was not detected. Improvement was observed in the activity by making an anion coexist therein.

Example 14

A catalyst for transesterification was obtained in the same manner as in Example 12 except that 17.3 g of 85% aqueous solution of orthophosphoric acid and 9.27 g of boric acid were used (this catalyst for transesterification is referred to as A-10). The content of boric acid-group as defined in Equation (1) was 50% by molecule. The reaction was carried out using the above-mentioned Catalyst A-10 under the same condition as in Example 1. The result is shown in Table 1. Further, in the product mixture after the reaction, dissolved aluminum, phosphorus or boron was not detected. Improvement was observed in the activity by making an anion coexist therein.

Comparative Example 1

The reaction was conducted under the same condition as in Example 1 except using 10 g of mordenite (Tosoh Corp.) which is one kind of zeolites. As shown in Table 1, the activity of transesterification was low. Glycerol was hardly formed, too. In addition, the dehydration of methanols as the starting material occurred to form a large amount of dimethyl ether.

Comparative Example 2

The reaction was conducted under the same condition as in Example 1 except using 10 g of montmorillonite (Silton™, Mizusawa Industrial Chemicals Ltd.) which is one kind of hydrous aluminum silicates. The result is shown in Table 1. The purity of glycerol was only 24%.

Comparative Example 3

Zirconium hydroxide (Daiichi Kigenso Kagaku Kogyo Co., Ltd.) was calcined in air at 300° C. for 2 hours to obtain hydrous zirconium oxide. Using this catalyst, the reaction was conducted under the same condition as in Example 1. The result is shown in Table 1.

TABLE 1

|  |  | Catalyst | Composition for charge (molar ratio) |  |  |  |  |  | Amount of carrier (% by weight) | Degree of conversion of triglyceride (%) | Methyl ester yield (%) | Proportion of ethers in glycerol (%) |
|---|---|---|---|---|---|---|---|---|---|---|---|---|
|  |  |  | Al | Ga | Fe | Mg | PO$_4$ | BO$_3$ |  |  |  |  |
| Examples | 1 | A-1 | 1 |  |  |  | 1 |  |  | 83 | 63 | 0.8 |
|  | 2 | A-2 | 1 |  |  |  | 1 |  |  | 83 | 69 | 2.9 |
|  | 3 | A-3 | 1 |  |  |  | 1.2 |  |  | 84 | 67 | 2.8 |
|  | 4 | A-4 | 1 |  |  |  | 0.5 |  |  | 87 | 69 | 2.5 |
|  | 5 | A-5 | 1 |  |  |  | 0.15 |  |  | 72 | 55 | 3.0 |
|  | 6 | G |  | 1 |  |  | 1 |  |  | 77 | 57 | 6.3 |
|  | 7 | F |  |  | 1 |  | 1 |  |  | 81 | 51 | 10.5 |
|  | 8 | AG | 0.9 | 0.1 |  |  | 1 |  |  | 85 | 68 | 3.1 |
|  | 9 | AM | 0.9 |  |  | 0.1 | 1 |  |  | 82 | 66 | 1.2 |
|  | 10 | A-6 | 1 |  |  |  | 1 |  | 80 | 83 | 65 | 2.6 |
|  | 11 | A-7 | 1 |  |  |  | 1 |  | 50 | 88 | 70 | 1.7 |
|  | 12 | A-8 | 1 |  |  |  | 1 |  | 20 | 87 | 68 | 1.6 |
|  | 13 | A-9 | 1 |  |  |  | 0.8 | 0.2 |  | 88 | 72 | 3.0 |
|  | 14 | A-10 | 1 |  |  |  | 0.5 | 0.5 |  | 87 | 69 | 2.4 |
| Comparative examples | 1 | Mordenite | — | — | — | — | — | — | — | 38 | 18 | — |
|  | 2 | Montmorillonite | — | — | — | — | — | — | — | 74 | 60 | 37.0 |
|  | 3 | Hydrous zirconium oxide | — | — | — | — | — | — | — | 69 | 45 | 0.5 |

(Note) The symbols in Table 1 have the following meanings.
Al: Al(NO3)$_3$.9H$_2$O
Ga: gallium nitrate hydrated with n moles of water per mole thereof (n is 7 to 9)
Fe: Fe(NO3)$_3$.9H$_2$O
Mg: Mg(NO$_3$)$_2$.9H$_2$O
PO$_4$: Orthophosphoric acid
BO$_3$: Boric acid A-1 was dried and used for reaction without calcination as catalyst for transesterification. The other catalysts than Catalyst A-1 in Examples were dried at 110° C. for 12 hours and calcined at 400° C. for 3 hours.

Example 15

Catalyst A-2 made of aluminum phosphate used in Example 2 was molded into a cylinder with diameter of 3 mm. 500 mL(ml) of this molded catalyst were charged into a reaction-column with an internal diameter of 35.5 mm, and continuous operation was conducted with palm-kernel oil (triglyceride) and methanol as the starting material. The operational condition was the reaction-temperature of 200° C., the molar ratio of methanol/triglyceride being 60 [mol/mol], and LHSV of 0.2 [1/hr]. As shown in Table 2, elution of aluminum and phosphorus was not observed even in the continuous operation for a long period, and the high yield of methyl ester was maintained, and high durability was shown.

Comparative Example 4

Titanosilicate [Ti/Si=1/9.2, prepared by alkoxide method ("Preparation of Catalysts Using Metal Alkoxides", p. 303, Edited by Akihumi Ueno et al., 1993, see IPC)] was extruded with a noodle-like form to prepare a molded product of titanosilicate. The catalyst was charged onto the same reaction-column as in Example 15, and the continuous reaction on a fixed-bed was carried out under the same condition as in Example 15. As shown in Table 2, the yield of methyl ester was gradually decreased. In addition, silicon was detected in the reaction product, recognizing the elution of the active component.

TABLE 2

| Catalyst | | Operational time (hr) | Methyl ester yield (%) | Elution of metal ion (ppm) |
|---|---|---|---|---|
| Example 15 | Molded product A-2 | 48 | 90.1 | Not detected |
| | | 96 | 89.8 | Not detected |
| | | 144 | 90.0 | Not detected |
| | | 192 | 89.9 | Not detected |
| Comparative example 4 | Molded product of titano-silicate | 48 | 60.2 | Si = 270 |
| | | 96 | 56.5 | Si = 230 |
| | | 144 | 54.3 | Si = 90 |
| | | 192 | 52.1 | Si = 90 |

Example 16

71.1 g of aluminum hydroxide was placed in a flask having 500 mL of capacity. To this flask, an aqueous solution of ammonium orthophosphate hydrated with three moles of water per mole thereof (i.e. a product comprising 5.34 g of $(NH_4)_3PO_4 \cdot 3H_2O$ dissolved in 156.4 g of water) was added thereto. Then, it was evaporated by a rotary evaporator to dry and solidify. The obtained powder was calcined at 500° C. for 2 hours in air to prepare Catalyst A-11 for transesterification (the atomic ratio of [phosphorus atom]/[aluminum atom]=0.054). 55.8 g of methanol was added to 200 g of palm-kernel oil (triglyceride), and 10 g of Catalyst A-11 was added thereto. After this mixture was reacted at the reaction-temperature of 200° C. for 5 hours, the catalyst was removed by filtration. When the solution after the reaction was analyzed, the degree of conversion of the starting triglyceride was 76% and the yield of methyl ester was 56%. At this time, in the product mixture after the reaction, dissolved aluminum or phosphorus was not detected so that the removal of an eluted catalyst-component by adsorption treatment etc. was not necessary. In addition, the purity of glycerol produced as by-product was 93.4%, and the concentration of an ether(s) in the glycerol was 3.4%.

Examples 17 and 18

The present catalysts were prepared in the same manner as in Example 16 except that the atomic ratio of [phosphorus atom]/[aluminum atom] was changed as shown in Table 3. Using each of the obtained catalysts, the reaction was carried out under the same condition as in Example 16. The results are shown in Table 3. In both cases, dissolved aluminum or phosphorus was not detected in the product mixture after the reaction.

Example 19

2.67 g of $(NH_4)_3PO_4 \cdot 3H_2O$ and 78.2 g of water were added to 33.4 g of iron (III) hydroxide prepared from iron (III) nitrate and then were dispersed therein. After that, the present Catalyst F-1 (atomic ratio of [phosphorus atom]/[iron atom]=0.042) was obtained in the same manner as in Example 16. Using Catalyst F-1, the reaction was carried out under the same condition as in Example 16. The result is shown in Table 3. At this time, in the product mixture after the reaction, dissolved iron or phosphorus was not detected.

Comparative Example 5

An un-calcined Catalyst A-14 was prepared in the same manner as in Example 17 except that drying was conducted in an evaporator and then calcination was not conducted. Using Catalyst A-14, the reaction was conducted under the same condition as in Example 16, and then the catalyst was removed by filtration. Analysis of the product after the reaction indicated that the degree of conversion of the triglyceride in the starting material was 76%, and the yield of methyl ester was 43%, and these values were lower than in Example 17 in which calcination was conducted at 500° C. (Table 3). Further, a soap content of 0.9% by weight was detected in the product mixture after the reaction. This shows that aluminum dissolved out.

TABLE 3

| | Catalyst | Phosphate source | Metal source | Atomic ratio* | Degree of conversion of triglyceride (%) | Methyl ester yield (%) | Proportion of ether(s) [note 1] in glycerol (%) |
|---|---|---|---|---|---|---|---|
| Examples | | | | | | | |
| 16 | A-11 | Ammonium phosphate | Aluminum hydroxide | 0.054 | 76 | 56 | 3.4 |
| 17 | A-12 | Ammonium phosphate | Aluminum hydroxide | 0.230 | 86 | 69 | 3.0 |

TABLE 3-continued

| | Catalyst | Phosphate source | Metal source | Atomic ratio* | Degree of conversion of triglyceride (%) | Methyl ester yield (%) | Proportion of ether(s) (note 1) in glycerol (%) |
|---|---|---|---|---|---|---|---|
| 18 | A-13 | Ammonium phosphate | Aluminum hydroxide | 0.537 | 85 | 67 | 2.4 |
| 19 | F-1 | Ammonium phosphate | Iron (III) hydroxide | 0.042 | 79 | 51 | 0.7 |
| Comparative examples | | | | | | | |
| 5 | A-14 (un-calcined) | Ammonium phosphate | Aluminum hydroxide | 0.230 | 76 | 43 | 1.7 |

*Atomic ratio: Atomic ratio of phosphate/metal as metal oxide etc.

(Note 1) The ether(s) refer to 3-methoxy-1,2-propanediol and 2-methoxy-1,3-propanediol which are formed by dehydration-condensing glycerol and methanol.

What is claimed is:

1. A method for producing an ester compound, which comprises transesterifying an alcohol, a carboxylic acid or an ester compound with a starting ester in the presence of a catalyst comprising a phosphate of at least one metal selected from the group consisting of aluminum, gallium and iron.

2. The method as claimed in claim 1, in which the catalyst comprises a boric acid-group or an alkaline earth metal.

3. The method as claimed in claim 1, wherein said catalyst is obtained by bringing a solution containing a phospate ion into contact with at least one of an oxide, a hydroxide and a nitrate of at least one metal selected from the group consisting of aluminum, gallium and iron.

4. The method as claimed in claim 1, wherein the said catalyst is prepared from a metal phosphate and an alkaline earth metal, boric acid or a borate.

5. The method of claim 1, wherein said catalyst has been calcined.

6. The method of claim 3, which further comprises calcining.

7. The method of claim 1, wherein the molar ratio of the metal ion to phosphate ion is from 1:2 to 1:0.01.

8. The method of claim 3, wherein the molar ratio of the metal ion to phosphate ion is from 1:2 to 1:0.01.

* * * * *